United States Patent
Leppisaari et al.

(10) Patent No.: US 7,554,935 B2
(45) Date of Patent: *Jun. 30, 2009

(54) POINT-TO-MULTIPOINT MOBILE RADIO TRANSMISSION

(75) Inventors: Arto Leppisaari, Tampere (FI); Jari Pekka Hämäläinen, Kangasala As. (FI)

(73) Assignee: Eastman Kodak Company, Rochester, NY (US)

( * ) Notice: Subject to any disclaimer, the term of this patent is extended or adjusted under 35 U.S.C. 154(b) by 742 days.

This patent is subject to a terminal disclaimer.

(21) Appl. No.: 10/818,244

(22) Filed: Apr. 5, 2004

(65) Prior Publication Data

US 2004/0190525 A1 Sep. 30, 2004

Related U.S. Application Data

(63) Continuation of application No. 09/132,122, filed on Aug. 10, 1998, now Pat. No. 6,717,925.

(30) Foreign Application Priority Data

Aug. 12, 1997 (FI) .................................. 973303

(51) Int. Cl.
*H04J 3/24* (2006.01)
(52) U.S. Cl. .................... 370/312; 370/392; 455/466
(58) Field of Classification Search ................ 370/312, 370/328, 338, 349, 389, 390, 392, 393, 467, 370/474, 475; 455/466, 450, 509, 517
See application file for complete search history.

(56) References Cited

U.S. PATENT DOCUMENTS

| | | | |
|---|---|---|---|
| 5,212,809 A | 5/1993 | Oka | 455/54.1 |
| 5,257,257 A | 10/1993 | Chen et al. | 370/18 |
| 5,515,513 A * | 5/1996 | Metzger et al. | 709/249 |
| 5,530,703 A * | 6/1996 | Liu et al. | 370/255 |
| 5,533,029 A | 7/1996 | Gardner | 370/94.1 |
| 5,640,395 A | 6/1997 | Hamalainen et al. | 370/322 |
| 5,729,534 A | 3/1998 | Jokinen et al. | 370/280 |

(Continued)

FOREIGN PATENT DOCUMENTS

WO WO 96/21984 7/1996

(Continued)

OTHER PUBLICATIONS

"Digital Cellular Telecommunications System (Phase 2+)"; General Packet Radio Service(GPRS); Service Description; Stage 2(GSM 03.60 version 5.2.0).

(Continued)

*Primary Examiner*—Phuc H Tran

(57) ABSTRACT

A method of operating a mobile communication system supporting data transmission between a mobile station (MS) and a network in a number of different packet data protocols (PDPs) including a point-to-multipoint-multicast (PTM-M) protocol. PDP data is formatted and unformatted by a subnetwork dependent convergence protocol (SNDCP) according to the PDP of data. The PDP is identified to the SNDCP by a protocol identifier transmitted between the network and the mobile station. In order to allow a MS to receive a PTM-M in an IDLE state, a unique protocol identifier is permanently assigned to PTM-M transmissions whilst other identifiers are dynamically assigned to other PDPs by the network.

18 Claims, 3 Drawing Sheets

U.S. PATENT DOCUMENTS

| | | | |
|---|---|---|---|
| 5,729,541 A | 3/1998 | Hamalainen et al. | 370/337 |
| 5,987,137 A * | 11/1999 | Karppanen et al. | 380/28 |
| 6,052,369 A * | 4/2000 | Hamalainen et al. | 370/389 |
| 6,201,974 B1 | 3/2001 | Lietsalmi et al. | 455/466 |
| 6,631,274 B1 * | 10/2003 | Keshavachar | 455/466 |

FOREIGN PATENT DOCUMENTS

| | | |
|---|---|---|
| WO | WO 98/25422 | 6/1998 |
| WO | WO 98/53576 | 11/1998 |

OTHER PUBLICATIONS

"Digital Cellular Telecommunications Systems"; General Packet Radio Service (GPRS): Mobile Station—Serving GPRS Support Node (MS-SGSN) Logical Link Control (LLC) Layer Specification (GSM 04.64 version 5.1.0).

"Digital Cellular Telecommunications System (Phase 2+)"; General Packet Radio Service(GPRS); Mobile Station(MS)—Serving GPRS Support Node (SGSN); Subnetwork Dependent Convergence Protocol (SNDCP) (GSM 04.65 version 5.0.0).

* cited by examiner

POINT-TO-MULTIPOINT MOBILE RADIO TRANSMISSION

CROSS REFERENCE TO RELATED APPLICATIONS

This application is a continuation of and claims priority from U.S. patent application Ser. No. 09/132,122, filed on Aug. 10, 1998 now U.S. Pat. No. 6,717,925.

FIELD OF THE INVENTION

The present invention relates to point-to-multipoint radio transmission and is applicable in particular, though not necessarily, to the General Packet Radio Service (GPRS) radio protocol proposed for mobile radio communications.

BACKGROUND OF THE INVENTION

Current digital cellular telephone systems such as GSM (Global System for Mobile communications) were designed with an emphasis on voice communications. Data is normally transmitted between a mobile station (MS) and a base station subsystem (BSS) over the air interface using the so called circuit switched transmission mode where a physical channel, i.e. a series of regularly spaced time slots on one or more frequencies, is reserved for the duration of the call. For voice communications, where the stream of information to be transmitted is relatively continuous, the circuit switched transmission mode is reasonably efficient. However, during data calls, e.g. internet access, the data stream is 'bursty' and the long term reservation of a physical channel in the circuit switched mode represents an uneconomic use of the air interface.

Given that the demand for data services with digital cellular telephone systems is increasing rapidly, a new GSM based service known as the General Packet Radio Service (GPRS) is currently being standardised by the European Telecommunications Standards Institute (ETSI) and is defined in overall terms in GSM 03.60. GPRS provides for the dynamic allocation of physical channels for data transmission. That is to say that a physical channel is allocated to a particular MS to BSS link only when there is data to be transmitted. The unnecessary reservation of physical channels when there is no data to be transmitted is avoided.

GPRS is intended to operate in conjunction with conventional GSM circuit switched transmission to efficiently use the air interface for both data and voice communications. GPRS will therefore use the basic channel structure defined for GSM. In GSM, a given frequency band is divided in the time domain into a succession of frames, known as TDMA (Time Division Multiplexed Access) frames. The length of TDMA frame is 4.615 ms. Each TDMA frame is in turn divided into eight consecutive slots of equal duration. In the conventional circuit switched transmission mode, when a call is initiated, a physical channel is defined for that call by reserving a given time slot (1 to 8) in each of a succession of TDMA frames. A series of four consecutive time slots on a physical channel is known as a radio block and represents the shortest transmission unit for packet switched data on a physical channel. Physical channels are similarly defined for conveying signalling information. With the introduction of GPRS, physical channels will be dynamically assigned for either switched circuit transmission mode or for packet switched transmission mode. When the network requirement for switched circuit transmission mode is high, a large number of physical channels may be reserved for that mode. On the other hand, when demand for GPRS transmission is high, a large number of physical channels may be reserved for that mode. In addition, a high speed packet switched transmission channel may be provided by assigning two or more slots in each of a succession of TDMA frames to a single MS.

The GPRS radio interface for GSM Phase 2+ (GSM 04.65) can be modelled as a hierarchy of logical layers with specific functions as shown in FIG. 1, where the mobile station (MS) and the network have identical layers which communicate via the MS/network interface Um. Each layer formats data received from the neighbouring layer, with received data passing from the bottom to the top layer and data for transmission passing from the top to the bottom layer.

At the top layer are a number of packet data protocols (PDPs). Certain of these PDPs are point-to-point protocols (PTPs) adapted for sending packet data from one MS to another MS, or from one MS to a fixed terminal. Examples of PTP protocols are IP (internet access protocol) and X.25. The PDPs all use a common subnetwork dependent convergence protocol (SNDCP) which, as its name suggests, translates (or 'converges') the different PDPs into a common form (composed of SNDCP units) suitable for further processing in a transparent way. This architecture means that new PDPs may be developed in the future which can be readily incorporated into the existing GPRS architecture.

The SNDCP defines multiplexing and segmentation of user data, data compression, TCP/IP header compression, as well as transmission according to the requested quality of service. SNDCP units are about 1600 octets and comprise an address field which contains a network service access point identifier (NSAPI) which is used to identify the endpoint connection, e.g. IP, X.25. Each MS may be assigned a set of NSAPIs independently of the other MSs.

Also on the top layer are other GPRS end point protocols such as SMS and signalling (L3M). Each SNDCP (or other GPRS end point protocol) unit is carried by one logical link control (LLC) frame over the radio interface. The LLC frames are formulated in the LLC layer (GSM 04.64) and include a header frame with numbering and temporary addressing fields, a variable length information field, and a frame check sequence. More particularly, the addressing fields include a service access point identifier (SAPI) which is used to identify a specific connection endpoint (and its relative priority and Quality of Service (QoS)) on the network side and the user side of the LLC interface. One connection endpoint is the SNDCP. Other endpoints include the short message service (SMS) and management layer (L3M). The LLC layer provides a convergence protocol for these different endpoint protocols. SAPIs are allocated permanently and are common to all MSs.

The Radio Link Control (RLC) layer defines amongst other things the procedures for segmenting and re-assembling Logical Link Control layer PDUs (LLC-PDU) into RLC Data Blocks, and for retransmission of unsuccessfully delivered RLC blocks. The Medium Access Control (MAC) layer operates above the Phys. Link layer (see below) and defines the procedures that enable multiple MSs to share a common transmission medium. The MAC function arbitrates between multiple MSs attempting to transmit simultaneously and provides collision avoidance, detection and recovery procedures.

The physical link layer (Phys. Link) provides a physical channel between the MS and the network). The physical RF layer (Phys. RF) specifies amongst other things the carrier frequencies and GSM radio channel structures, modulation of the GSM channels, and transmitter/receiver characteristics.

For GPRS transmission, three different mobility management states are defined: IDLE, STANDBY, and READY. An IDLE state MS is not GPRS 'attached' and so the network is not aware of this MS. However, the MS is listening to broadcast control messages, for example, to determine network cell selection. A STANDBY state MS is GPRS attached and it's location (routing area) is tracked by the network. However, there is no data being transmitted. A MS is in a READY state when it is transmitting data and for a short while after. A READY state MS is therefore also tracked by the network. As currently proposed, there are 16 unique NSAPI codes available for identifying PDPs. The NSAPI codes are assigned dynamically by the network so that a MS must be in either the STANDBY state or the READY state to be aware of the allocated codes. As currently proposed, an IDLE state MS cannot receive transmissions in any PDP. For PDPs such as IP and X.25 this does not present a problem as the MS will always be in either the STANDBY or READY state when such transmissions are taking place.

In addition to PTPs, it is likely that future releases of GSM will specify other PDPs and in particular point-to-multipoint (PTM) transfer where data is transmitted to a group of MSs (PTM-G, point-to-multipoint-groupcall) or to all mobiles in an area (PTM-M, point-to-multipoint-multicast). The uses of such PDPs include operator announcements, advertisements, and specific information transfer such as football results, news etc. PTP-G is similar to PTP in so far as a MS must be in either the STANDBY or READY state to receive a transmission. However, a hitherto unrecognised problem arises with PTM-M due to the need (defined in GSM 03.60) for a MS to receive PTM-M transmissions in all states including the IDLE state. As no PDP contexts are active when a MS is in the IDLE state, and the allocation of NSAPI codes by the network is dynamic, an IDLE MS cannot allocate the correct NSAPI code to a PTM-M and therefore cannot receive a PTM-M.

Whilst the above discussion of GPRS has been concerned with GSM, it is noted that GPRS has a much wider applicability. For example, by changing only the low level radio protocol, GPRS may be adapted to the proposed third generation standard UMTS (Universal Mobile Telecommunication System)

SUMMARY OF THE INVENTION

It is an object of the present invention to overcome the problem noted above. In particular, it is an object of the present invention to enable a mobile station to receive a PTM-M even when the MS is in an IDLE state.

According to a first aspect of the present invention there is provided a method of operating a mobile communication system supporting radio data transmission between a mobile station (MS) and a network in a number of different packet data protocols (PDPs) including a point-to-multipoint-multicast (PTM-M) protocol, where the protocol is identified by a protocol identifier transmitted between the network and the mobile station, the method comprising permanently allocating a unique protocol identifier to PTM-M transmissions.

Preferably, data is formatted for transmission according to a subnetwork dependent convergence protocol (SNDCP). The SNDCP formats data, in one of a plurality of different packet data protocols (PDP), for transmission via the system and vice versa for received data. The SNDCP processes data in SNDCP units, each of which contains a network service access point identifier (NSAPI) which identifies the PDP in use, to the SNDCP. The NSAPI may provide said protocol identifier. Typically the NSAPI has a value of 0 to 15 and it is one of these values which is permanently assigned to PTM-M.

Data for transmission and reception may be formatted by a logical link control (LLC) layer below an SNDCP layer. LLC formatting includes the use of a service access point identifier (SAPI) to identify the service access point on the network side and on the user side of the LLC layer. The SAPI may provide said protocol identifier.

The present invention is applicable in particular to GPRS as specified for GSM networks. However, it may also be applied to other systems such as GPRS for UMTS.

According to a second aspect of the present invention there is provided apparatus for implementing the method of the above first aspect of the present invention.

According to a third aspect of the present invention there is provided a mobile communication device arranged to support the method of the above first aspect of the present invention, the device comprising a memory in which is stored the permanently allocated PTM-M protocol identifier, and signal processing means for determining when a transmission from the network contains said PTM-M protocol identifier and for consequently receiving and processing said transmission.

Embodiments of the above third aspect of the present invention include mobile cellular telephones and combined mobile telephone/personal digital assistant devices.

For a better understanding of the present invention and in order to show how the same may be carried into effect reference will now be made, by way of example, to the accompanying drawings, in which.

Figure 2:
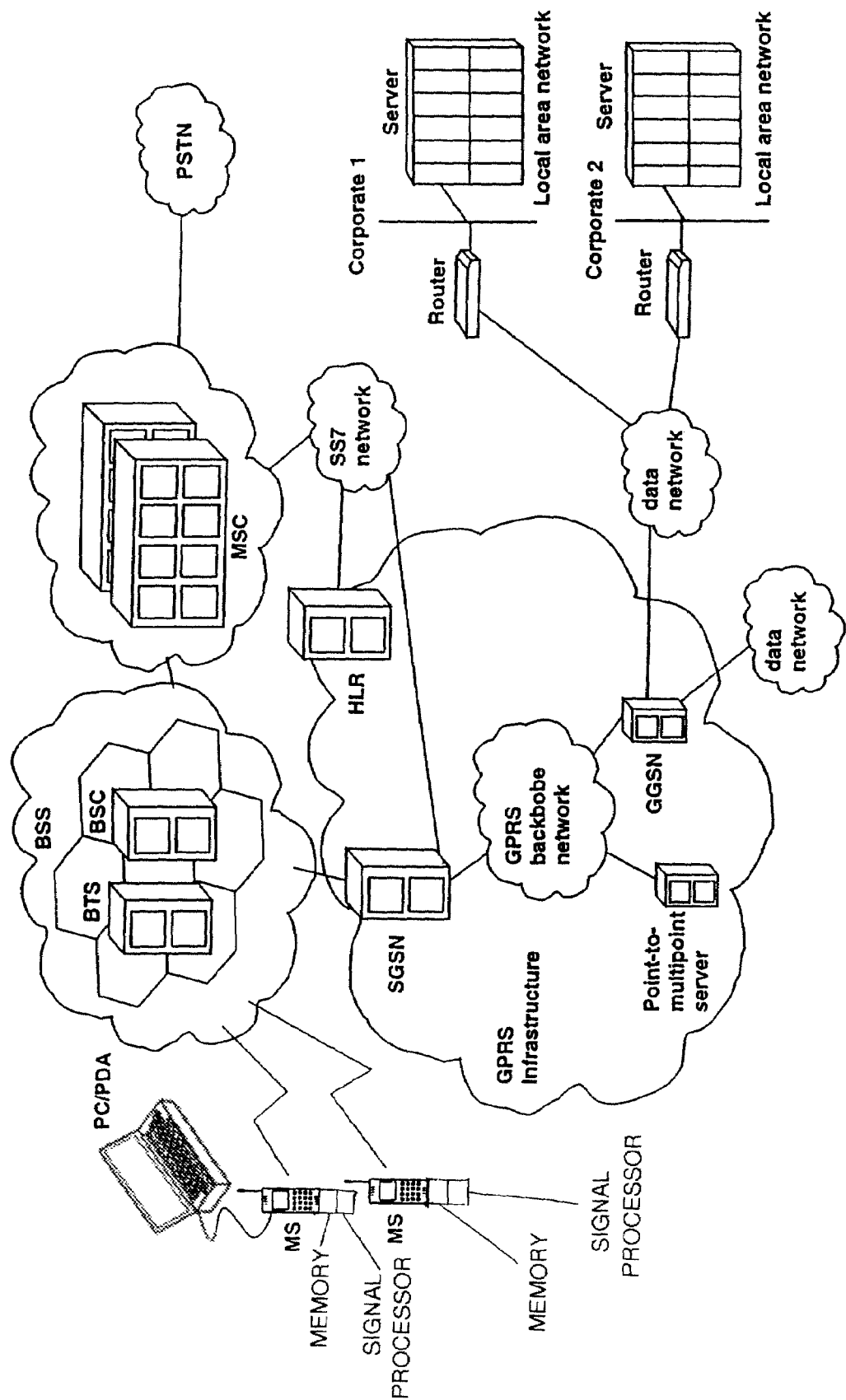
FIG. 2 shows schematically the architecture of a GSM/GPRS digital cellular telephone network.

There is illustrated in FIG. 2 the basic 'architecture' of a GSM cellular network which supports GPRS. The terminology used in FIG. 2 is defined, by convention, in the list given below. Other terms used in this description are also defined.

DETAILED DESCRIPTION

Figure 1:
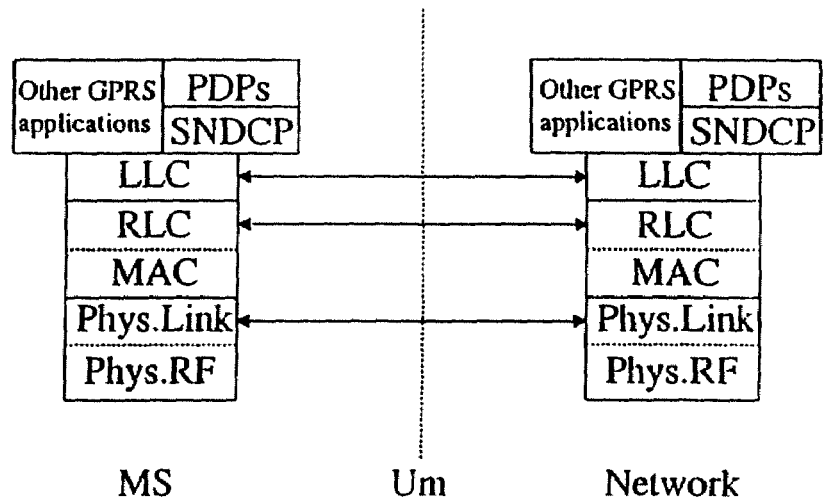
FIG. 1 illustrates the protocol layers of a GPRS radio link of the network of FIG. 2.

The general architecture of the GPRS protocol layers has already been described above with reference to FIG. 1. The present invention is primarily concerned with the upper layers of this architecture and as such the RLC, LLC, and layer 3 entities are shown separately in FIG. 2. The layer 3 entities shown are signalling, SMS, and the packet data protocols IP and X.25 (both PTPs), PTM-G, and PTM-M.

The LLC layer formats data into LLC frames each of which contains a data link connection identifier (DLCI) which in turn contains a SAPI (with a value of from 0 to 15). As already explained above, the SAPI identifies the service access point on the network side and the user side of the LLC layer. SAPIs have a predefined value, known to the network and the listening MSs (typically the SAPIs are prestored in a memory of the MS), so that the LLC layer can 'route' received transmissions appropriately even in the IDLE state. Consider for example the case where a transmission is received by a MS.

The LLC layer selects the appropriate service access point, i.e. signalling, SMS, or SNDCP, in dependence upon the SAPI.

In the case that the SAPI identifies the SNDCP, the data is then processed in accordance with the SNDCP. Each SNDCP data unit contains in turn an NSAPI which identifies the particular PDP being used, i.e. IP, X.25, PTM-G, or PTM-M. NSAPIs can have a value from 0 to 15, represented by a four bit binary code. Unlike the SAPIs which are permanently allocated, the NSAPIs for IP, X.25, and PTM-G (and possibly up to 11 other PDPs) are allocated dynamically by the network. MSs are notified of the dynamic allocation by signalling messages. However, these are only received by MSs which are in either the STANDBY or READY state.

One NSAPI is permanently assigned to the PTM-M PDP and this is known to the MS and to the network. As with the SAPIs, the PTM-M NSAPI is prestored in a memory of the MS. In the event that a MS is the IDLE state, and a received SNDCP unit is routed to the SNDCP from the LLC layer, the NSAPI of the unit is read to determine if it corresponds to the PTM-M NSAPI. If so, then the SNDCP processes the unit accordingly and the PTM-M PDP is applied. If the NSAPI does not correspond to PTM-M NSAPI, then no further processing is carried out because the PDP used cannot be identified.

Figure 3:
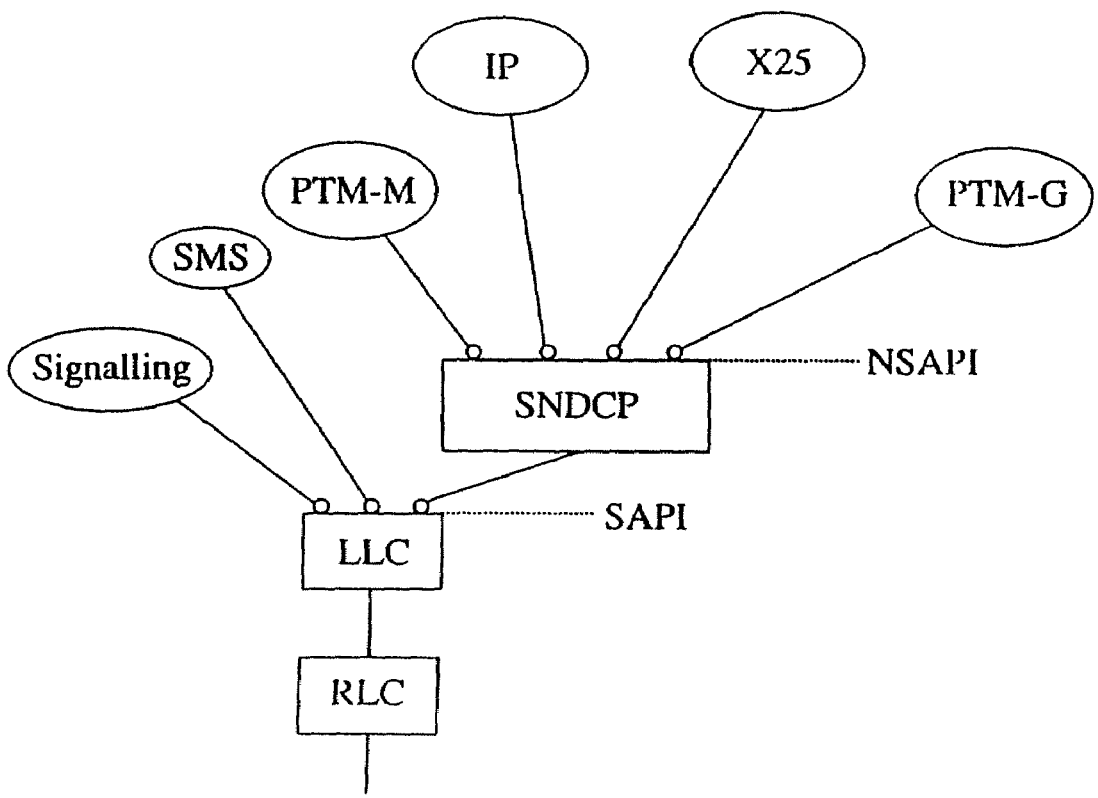
FIG. 3 illustrates in more detail the upper layers of the protocol of FIG. 1.
Figure 4:
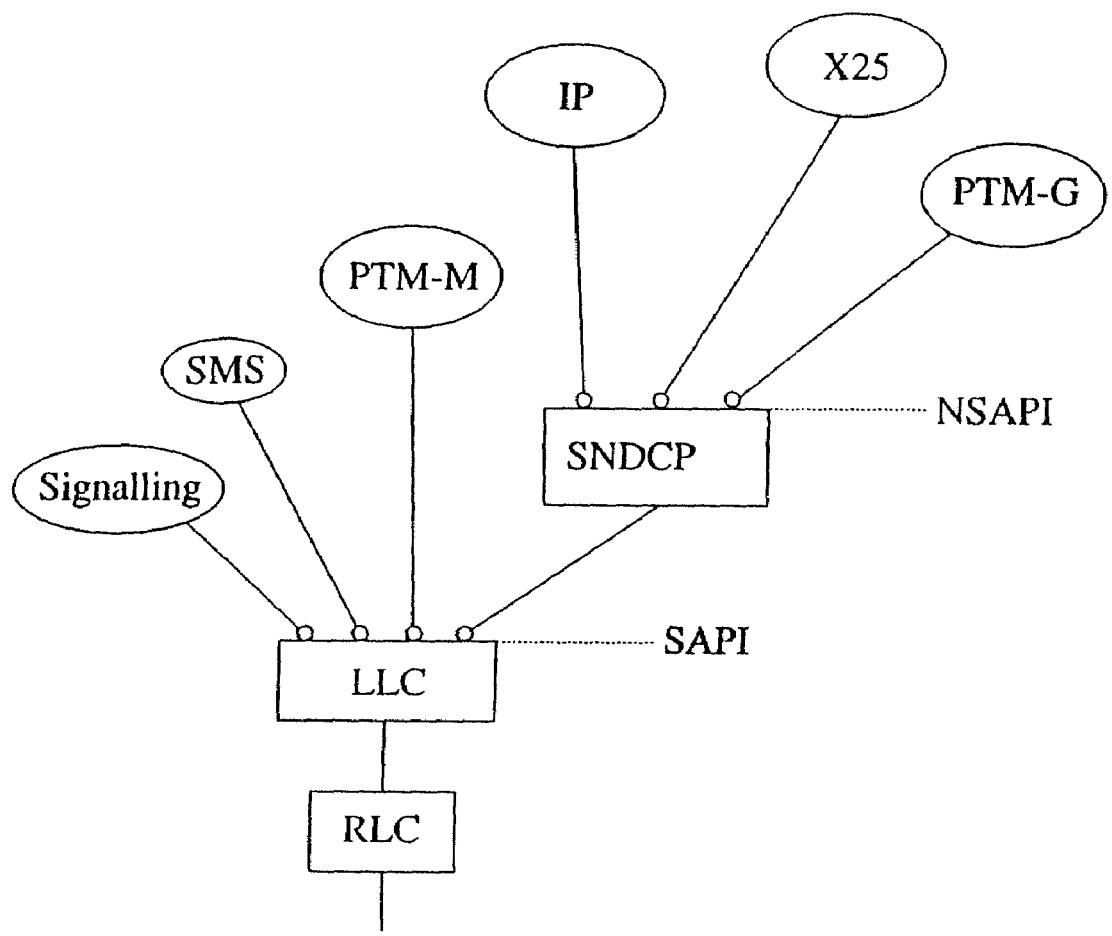
FIG. 4 illustrates a modification to the architecture shown in FIG. 3.

FIG. 4 illustrates a modification to the protocol architecture show in FIG. 3. This relies upon PTM-M transmissions not being routed through the SNDCP layer. Rather, these transmissions are routed to the PTM-M layer directly from the LLC layer. In this case, a PTM-M transmission can be identified by permanently allocating a SAPI to PTM-M transmissions.

| | |
|---|---|
| BSC | Base Station Controller |
| BSS | Base Station Subsystem |
| BTS | Base Transceiver Station |
| GGSN | Gateway GPRS Support Node |
| GPRS | General Packet Radio Service |
| GSM | Global System for Mobile Communications |
| HLR | Home Location Register |
| IP | Internet Protocol |
| L3M | Layer 3 Management |
| LLC | Logical Link Control |
| MAC | Medium Access Control |
| MS | Mobile Station |
| MSC | Mobile Switching Centre |
| NSAPI | Network Service Access Point Identifier |
| PC/PDA | Personal Computer/Personal Data Assistant |
| PDP | Packet Data Protocol |
| PDU | Packet Data Unit |
| PSTN | Public-Switched Telephone Network |
| PTM-G | Point-To-Multipoint Group |
| PTM-M | Point-To-Multipoint Multicast |
| PTP | Point-To-Point |
| RLC | Radio Link Control |
| SAPI | Service Access Point Identifier |
| SGSN | Serving GPRS Support Node |
| SMS | Short Message Service |
| SNDCP | Subnetwork Dependent Convergence Protocol |
| SS7 | Signalling System number 7 |
| TCP/IP | Transmission Control Protocol/Internet Protocol |
| TDMA | Time Division Multiplexed Access |
| Um | Mobile Station to Network interface |
| UMTS | Universal Mobile Telecommunications Service |
| X.25 | network layer protocol specification |

The invention claimed is:

1. A method comprising:
identifying, in mobile communication system supporting radio data transmission in a number of different packet data protocols, said different packet data protocols by a protocol identifier, the method further comprising:
permanently allocating a specific unique value of said protocol identifier to point-to-multipoint-multicast packet data protocol; and
dynamically allocating other protocol identifier values to other packet data protocols.

2. A method according to claim 1, wherein the method forms part of a general packet radio service.

3. A method according to claim 1, wherein data is formatted for transmission according to a subnetwork dependent convergence protocol which formats data in one of a plurality of different packet data protocols for transmission via the system and vice versa for received data, the subnetwork dependent convergence protocol processing data in subnetwork dependent convergence protocol units, each of which contains a network service access point identifier which identifies the packet data protocol in use to the subnetwork dependent convergence protocol and the network service access point identifiers providing said protocol identifiers.

4. A method according to claim 1, wherein data for transmission and reception is formatted by a logical link control layer below a subnetwork dependent convergence protocol layer, the logical link control formatting including the use of a service access point identifier to identify the service access point on the network side and on the user side of the logical link control layer and the service access point identifiers providing said protocol identifiers.

5. Method according to claim 1, wherein said identifying and allocating is performed by a mobile station or a network.

6. A method according to claim 1, wherein a network service access point identifier provides said protocol identifier.

7. Apparatus for use in a mobile communication system supporting radio data transmission in a number of different packet data protocols including a point-to-multipoint-multicast protocol, where the protocol is identified by a protocol identifier transmitted between network and said apparatus, the apparatus comprising:
a memory for permanently allocating a specific unique value of a protocol identifier to point-to-multipoint-multicast protocol,
said memory for storing the permanently allocated point-to-multipoint-multicast protocol identifier, and
a signal processor for determining whether a transmission from network contains said point-to-multipoint-multicast protocol identifier and for consequently receiving and processing said transmission.

8. Apparatus according to claim 7, wherein the apparatus forms part of a general packet radio service.

9. Apparatus according to claim 7, wherein the apparatus is a mobile station.

10. Apparatus according to claim 7, wherein the apparatus is arranged to determine if a received protocol identifier corresponds to a prestored permanently allocated protocol identifier value.

11. A method comprising:
identifying, in a mobile communication system supporting radio data transmission in a number of different packet data protocols including a point-to-multipoint-multicast protocol, the packet data protocols by a protocol identifier;
permanently allocating a specific unique value of said protocol identifier to point-to-multipoint-multicast packet data protocol; and
determining if a received protocol identifier corresponds to a prestored permanently allocated protocol identifier value.

12. An apparatus comprising:
a receiver, in a mobile communication system supporting radio data transmission in a number of different packet data protocols including a point-to-multipoint-multicast protocol, configured for receiving a data unit comprising a protocol identifier,
a signal processor configured for processing the received protocol identifier, wherein said protocol identifier has a value permanently allocated to point-to-multipoint-multicast protocol, and wherein the apparatus is configured to identify said point-to-multipoint-multicast protocol based on said protocol identifier value received by the apparatus, and a memory configured for storing a unique value of a protocol identifier permanently allocated to point-to-multipoint-multicast protocol.

13. Apparatus according to claim 12, wherein the apparatus forms part of a general packet radio service.

14. Apparatus according to claim 12, wherein the apparatus is a mobile station.

15. Apparatus according to claim 12, wherein a network service access point identifier provides said protocol identifier.

16. Apparatus according to claim 12, comprising:
said signal processing means configured for determining whether a received transmission contains said permanently allocated PTM-M protocol identifier value and for processing said transmission.

17. An apparatus comprising:
a receiver, for a mobile communication system supporting radio data transmission in a number of different packet data protocols including a point-to-multipoint-multicast protocol, configured to receive a data unit comprising a protocol identifier, and a signal processor configured for processing the received protocol identifier, wherein said protocol identifier has a value permanently allocated to point-to-multipoint-multicast protocol, and wherein the apparatus is configured to identify said point-to-multipoint-multicast protocol based on said protocol identifier value received by the apparatus, and the apparatus is arranged to determine if a received protocol identifier corresponds to a prestored permanently allocated protocol identifier value.

18. The apparatus of claim 17 further comprising that the apparatus forms part of a general packet radio service.

* * * * *